United States Patent
Chen et al.

(10) Patent No.: US 11,157,637 B2
(45) Date of Patent: Oct. 26, 2021

(54) NETWORK OUTAGE REDUNDANCY MODULE

(71) Applicant: Cash Flow Management, Inc., Chandler, AZ (US)

(72) Inventors: Jianing Chen, Gilbert, AZ (US); Nathan Moore, Scottsdale, AZ (US); Jim Ransco, II, Paradise Valley, AZ (US); John Dillon, Gilbert, AZ (US)

(73) Assignee: Cash Flow Management, Inc., Chandler, AZ (US)

( * ) Notice: Subject to any disclaimer, the term of this patent is extended or adjusted under 35 U.S.C. 154(b) by 0 days.

(21) Appl. No.: 16/377,353

(22) Filed: Apr. 8, 2019

(65) Prior Publication Data
US 2019/0236291 A1    Aug. 1, 2019

Related U.S. Application Data

(63) Continuation of application No. 13/335,645, filed on Dec. 22, 2011, now Pat. No. 10,262,147.

(51) Int. Cl.
*G06F 21/00* (2013.01)
*G06F 21/60* (2013.01)
*H04L 29/06* (2006.01)

(52) U.S. Cl.
CPC ............ *G06F 21/608* (2013.01); *H04L 63/04* (2013.01)

(58) Field of Classification Search
CPC .............................. G06F 21/608; H04L 63/04
See application file for complete search history.

(56) References Cited

U.S. PATENT DOCUMENTS

| | | | |
|---|---|---|---|
| 6,308,887 B1 * | 10/2001 | Korman | G06Q 20/18 235/379 |
| 7,546,274 B2 | 6/2009 | Ingram et al. | |
| 2003/0046231 A1 * | 3/2003 | Wu | G06Q 20/18 705/43 |
| 2006/0004927 A1 * | 1/2006 | Rehman | G06F 16/95 709/250 |
| 2009/0018958 A1 | 1/2009 | Aveyard et al. | |
| 2012/0197797 A1 * | 8/2012 | Grigg | G07F 19/20 705/43 |

OTHER PUBLICATIONS

Jan. 12, 2017 USPTO Office Action (U.S. Appl. No. 13/335,645)—Our Matter 5672.
Oct. 10, 2013 USPTO Office Action (U.S. Appl. No. 13/335,645)—Our File 5672.
Dec. 12, 2012—USPTO Office Action (U.S. Appl. No. 13/335,645)—Our File 5672.
Jun. 29, 2018 USPTO Office Action (U.S. Appl. No. 13/335,645)—Our Matter 5672.
Aug. 24, 2017 USPTO Office Action (U.S. Appl. No. 13/335,645)—Our Matter 5672.

* cited by examiner

*Primary Examiner* — Clifford B Madamba
(74) *Attorney, Agent, or Firm* — Forsgren Fisher; Daniel Tsyver; James Urzedowski

(57) ABSTRACT

A network outage and redundancy module which provides improved security, platform independence and continuity in information between financial hardware and enterprise applications.

32 Claims, 4 Drawing Sheets

NETWORK OUTAGE REDUNDANCY MODULE

FIELD OF INVENTION

The present invention relates to systems and methods for providing connectivity and security to computer hardware on a network connection while maintaining availability of the hardware driven over the network to provide business continuity during an outage of the network.

BACKGROUND OF THE INVENTION

Within the financial industry, equipment which is responsible for handling cash and currency is critical to satisfying the most basic financial functions. Therefore, if this equipment is not available to the financial institution, due to network error, the institution is at risk of not being capable of satisfying the transactional needs of its customers. This lack of redundancy has the potential to significantly reduce customer satisfaction, and ultimately result in loss of clients and revenue.

In the financial industry, financial hardware must communicate across local area and wide area networks to provide its functionality. Furthermore, this financial hardware is typically built on proprietary systems which require custom communication interfaces to communicate with local and distant servers. The current communications between hardware and servers also lacks adequate security measures, such as data protection functionality (e.g. encryption, redundancy, etc.) and redundancy. Increasingly, hardware is driven via internet protocol (IP) and treated as a device on the network. If the connection to the network is lost, the hardware is rendered unusable. In a standard enterprise environment, the weakest point is the communication infrastructure on which the communication and data transfer ride. When this infrastructure is down, the hardware can not be used, which can be a devastating loss to the enterprise.

SUMMARY OF THE INVENTION

Systems and methods have been developed in which in accordance with one embodiment, a small foot print module including a proprietary software package is installed between a hardware solution and the hardware's access to the network. The module may then supply hardware drivers, communication controllers, security components, local data storage and/or logical control to the hardware solution. The implementation of the module improves the security, reliability, and ease of connectivity of the hardware to enterprise servers. The lean nature of the module makes it operable on very limited amount of computing power and storage.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
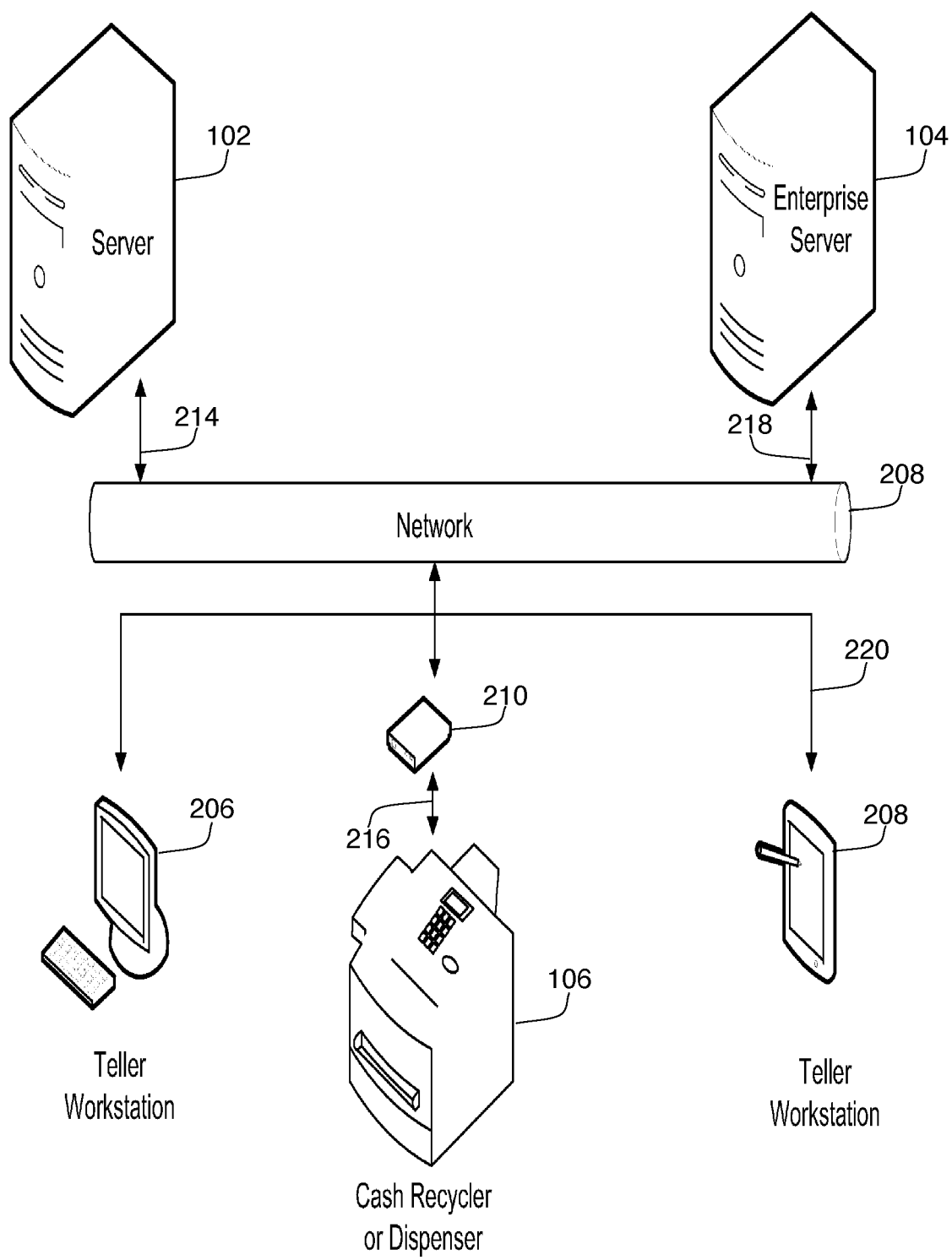
FIG. 1 is an example diagram illustrating a module installed with a hardware solution in a non-disaster situation.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "one embodiment", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer, teller workstations, or the like) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available or proprietary web-browser software. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. internet protocol security (IPsec), secure shell (SSH)), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft. Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available e.g., Twofish, RSA, E1 Carnal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft. SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CU), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference. Intergalactic The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Computer program instructions as discussed herein may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

In accordance with various aspects of the present invention, a computer peripheral device (CPD) may be provided to increase computer hardware security, availability, and/or connective. The CPD may comprise one or more modules connected to a communications line on a hardware solution such that communications pass through the CPD. In accordance with various embodiments the CPD may be configured to operate as a network outage and redundancy module (NORM). In accordance with one embodiment, the module may provide connectivity between a hardware solution and a network. The network may then be connected to a computing system which benefits from the connection to the hardware solution. While the computing system may include any, server, workstation, laptop, note book, tablet, phone, handheld, similar computer device, or a collection of the same (discussed in more detail above), in one example the computing system is one or more servers that operate a financial services enterprise system. Thus the connectivity may further provide for IP and enterprise based functionality. In another embodiment a module may provide enterprise based security by supplying SSL encryption for all communication between the module and the network. In accordance with another embodiment of the invention, a module may provide bridge operations during a network loss while driving hardware via network connection.

As discussed herein computer hardware and/or hardware solutions are generally directed to hardware used in the financial services industry such as cash dispensers, cash recyclers, coin dispensers, bill acceptors, pin pads, printers, card readers, scanners, signature pads and etc. However, these particular examples of hardware are merely a subset of hardware that is driven via IP and treated as a device on the network. As such, any item or items of hardware that is IP driven and/or treated as a network device is contemplated herein.

As indicated, a hardware solution may be driven via IP (or any other communications protocol known or developed) and treated as a device on the network. However, if the connection to the network is lost, the hardware may be rendered unusable. Thus, in an enterprise environment, a weak point is the communication infrastructure on which the communication and data is transferred.

In accordance with various embodiments, a standalone module may be placed local to the hardware solution between the network and the hardware solution to provide intelligence to drive, monitor, and store all activity for the hardware solution. In one example the module may be placed local to the hardware solution to perform one or more of these operations without dependence on any network connectivity, for example on or in contact with the hardware solution. In another embodiment the module may be placed within a local area network, having only minimal dependence on network connectivity.

In an example, the module may be a standalone device connected externally to the hardware such that the module may receive the hardware's incoming and outgoing communications. In another example, the module may be an integrated device within the hardware solution such that the module takes up no space. In various examples, whether mounted internally or externally the module may be installed with the hardware solution either after the hardware solution is in use at a facility or prior to the hardware solution being distributed to a customer.

In accordance with various embodiments, the module may be packaged as any computer peripheral component such as part of a separate workstation. However, it may be preferable to have a zero or near zero foot print. For example the module may be a dedicated peripheral device, packaging only the necessary hardware to perform the functions discussed herein. In such a limited package the module takes up minimum space. In this form of standalone package, the module may be placed on, in or near the hardware, which the module provides functionally to, without consuming the space that a workstation or other general use device would occupy. As such, by connecting the module to the hardware solution, the hardware solution may operate without a local workstation. The module may be of sufficient size to perform any combination of embodiments discussed herein, but still be sufficiently small to locate on or immediately adjacent to the hardware solution.

In accordance with one embodiment, a module may provide additional security to communications from the hardware solution. For example, the module may encrypt information that the module receives from the hardware solution prior to transmitting the information to subsequent third parties and/or enterprise servers. Various communications from the server layer to NORM and back may be fully encrypted with as security system such as SSL and SSH.

In accordance with various embodiments, a module may provide redundancy by storing information received from the hardware solution. In one example, the module may continually buffer all information passing through such that for a given time period any information can be recovered.

In accordance with one embodiment, the module may monitor the network connection. The module may determine the status of the network meaning whether the network is operational or non-operation. In one example, the module may only save information from the hardware solution in response to the network status being non-operational. The module may continually monitor the network for adequate connectivity such that in the event of any disruption the module may activate the modules data storage functionality. The module may also continually monitor the network during an outage, such that communication can begin again as soon as the network is restored. Once the network connection is restored, the module may forward the stored communications to the computing system on the network to return the hardware solution to normal operation while maintaining the integrity of all data. In various examples the module may operate on less than 8 MB of memory.

In accordance with various embodiments of the present invention, the module may drive a web service which can maintain integration between the hardware solution and the financial network. The module allows communication between third parties and enterprise service directly through the module as opposed to though parallel channels. This centralized connection and operation as a web service enables the module to log communications between multiple parties including for example the hardware solution, the local financial institution associated with the hardware solution, an enterprise server, a third party servicer of the system, any enabled computing system or the like.

In accordance with an embodiment of the present invention, the module may be platform independent. The module may function as a universal driver operating with a variety of different hardware solutions. As a variety of different hardware solutions may be designed and developed by any number of different manufacturers, the hardware solution's native communications protocol is frequently proprietary. Financial institutions, on the other hand, use enterprise systems to drive the hardware solutions. While the enterprise system may be set up to communicate more than one type of hardware solution, it may be costly to reconfigure the enterprise system to communicate with new hardware solutions. In various embodiments, the module may be configured to receive the hardware solutions proprietary communication then convert the communications to a second communication that the enterprise system or enabled computing system is able to receive. In various examples the second communication may be a universal communication protocol.

In accordance with various embodiments of the present invention, the module may be programmed to be efficiently configured to occupy a very small hardware package. In another embodiment the module software may occupy very little memory. In one embodiment the module may operate very fast. For example, the module software may be written in a low level or machine language. In another example, the module may not incorporate a dynamic link library (DLL). In various examples, the module may include a proprietary software package for example, one designed to run in a Linux environment. The module may further include hardware drivers, communication controllers, security components, local data storage and logical control. As discusses above, the module may communicate with a hardware solution using a native communication protocol proprietary to the hardware solution.

In accordance with various embodiments, the module may be configured to receive and store communications from the hardware solution. For example, the module may log every communication into memory. In another example the module may log only select communication into memory such as device operation results. The system may be configured to push or pull the operation result data. The communication log can be optionally stored by configuring the settings for the communication log to store the communications. In one example, the default configuration for the module does not log operation result and device communication in case the network is connected. In one example the module can automatically switch the configuration from not storing communications to storing the communications in response to the network failing.

In accordance with an embodiment of the present invention, and with reference to FIG. 1, a module 210 may be embedded on a hardware solution 106 such as a cash recycler and/or cash dispenser. Module 210 may be connected to hardware 106 by a connection 216. However, depending on the hardware and specific information requirements any communication connection may be used, such as Serial, USB, mini-USB, LAN, SCSI, ATA, SATA, eSATA, HDMI, HDMI-mini, DVI, DisplayPort, Mini-DisplayPort, Firewire, Fiber Optic, Voice/Data connection, etc. Module 210 may receive information from hardware solution 106. Module 210 may provide instant adaptability to any hardware solution overcoming industry portability requirements to the proprietary nature of the hardware solution, particularly Cash Dispensers and Recyclers. Module 210 may buffer the information prior to sending it over Network 208. Module 210 may encrypt the information prior to sending it over Network 208. Module 210 may be connected to a LAN 220 in addition to connection to network 208. An enterprise server 104 may drive hardware 106 via simplified protocols over network 208, which may be for example, a (WAN). Module 210 may receive the driver instructions from enterprise server 104 and provide encryption and conversion of the information into hardware solution 106's more complicated proprietary communications protocol.

Figure 2:
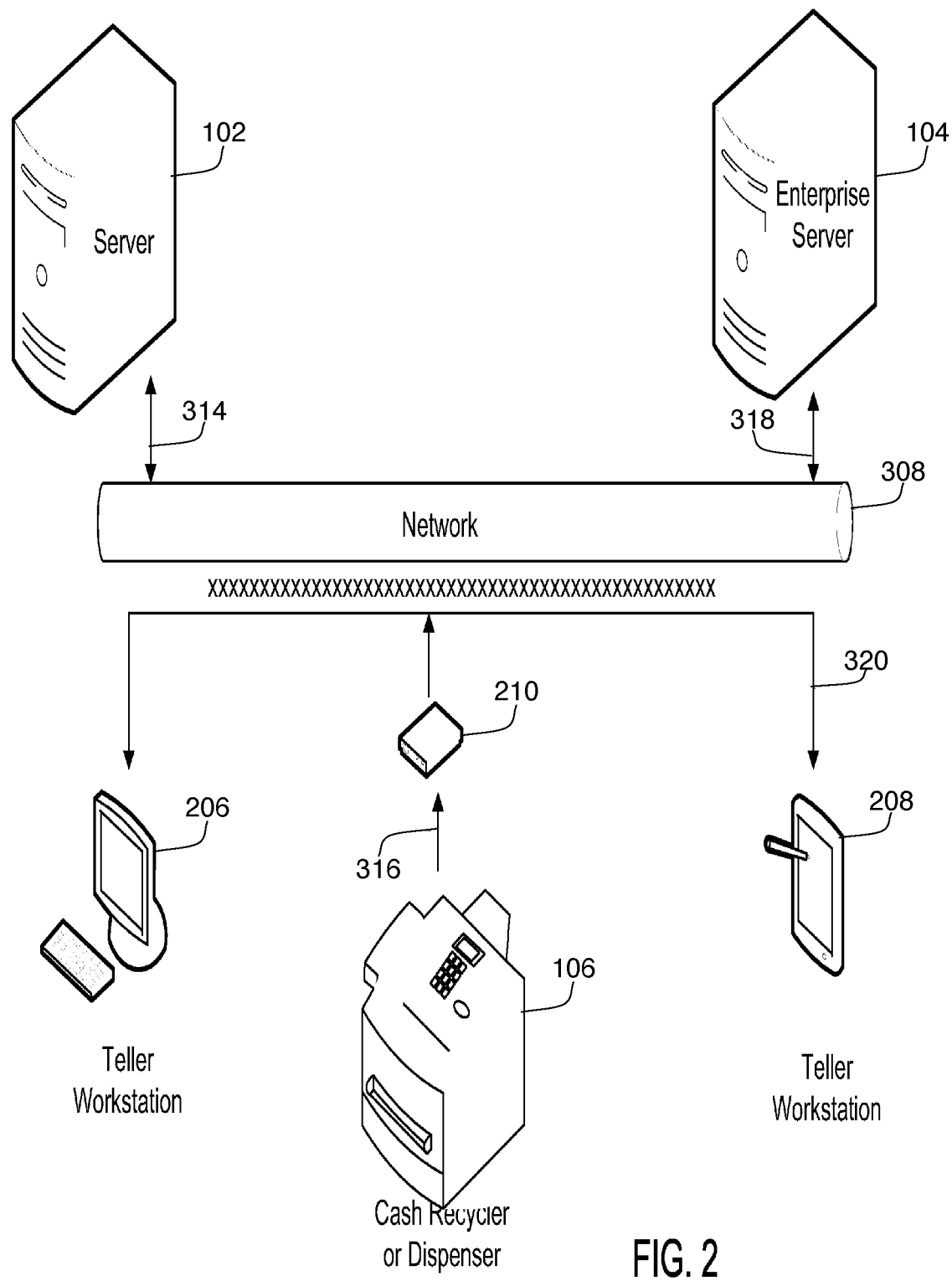
FIG. 2 is an example diagram illustrating a module installed with a hardware solution in a disaster situation.

In accordance with an embodiment of the present invention, and with reference to FIG. 2, module 210 may be embedded on hardware solution 106 in a disaster situation. A disaster situation may include instances when enterprise server 104 is not available due to WAN 318 outage and/or server 104 failure. A disaster situation may include when server 102 is not available due to WAN 314 outage and/or server 102 failure. A disaster situation may include when network 308 is not operable. A disaster situation may include when LAN 320 is not available do local disruption. In such disaster instances module 210 may store all or substantially all functionality and communication from hardware solution 106. If LAN 320 is available, module 210 may store all LAN 320 communications to and from hardware solution 106. Module 210 may provide local tools for access to the hardware solution within the local area network (LAN), if available, via web service protocols and browser based controls.

Figure 3:
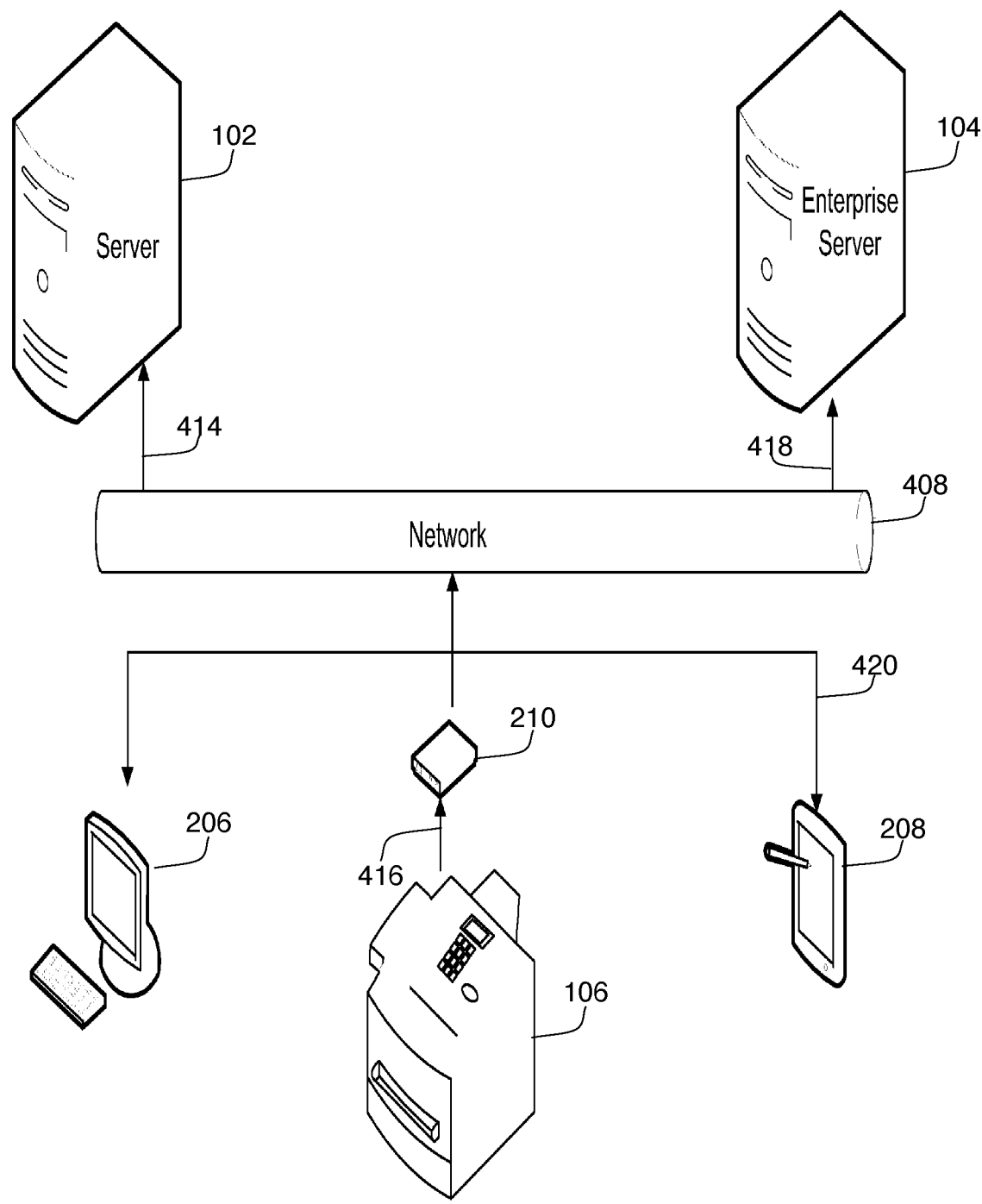
FIG. 3 is an example diagram illustrating a module installed with a hardware solution in a post disaster situation.

In accordance with an embodiment of the present invention, and with reference to FIG. 3, module 210 may be included with hardware solution 106 in a post disaster situation. In such an instance, the various servers have become available once more via connection 418, connection 414, network 408, and/or LAN 420. Module 210 may then begin forwarding all data that was logged and stored locally during the disaster situation. Forwarding all stored data allows module 210 to keep the servers in sync. In one example, module 210 may forward all stored data in parallel to performing other functions, such as for example buffering and encrypting new information. In another example, module 210 may forward information without performing any other functions, allowing hardware solution 106 to forward new information across connection 416 independently. After all stored information has been forwarded, module 210 may return to pre disaster operations, such as those illustrated in FIG. 1.

In accordance with various embodiments, the module checks network connectivity. In one example, the module checks before an operation request. In another example the module checks after operation completion. As with other examples disclosed herein the module may operate in accordance with multiple examples, such as checking network connectivity before an operation request and after operation completion. In response to a network outage, all the communication and operation result will be stored on the module. Once communication is restored, local stored information may be retrieved by external application or be sent to external application depends on the module's system configuration.

Figure 4:
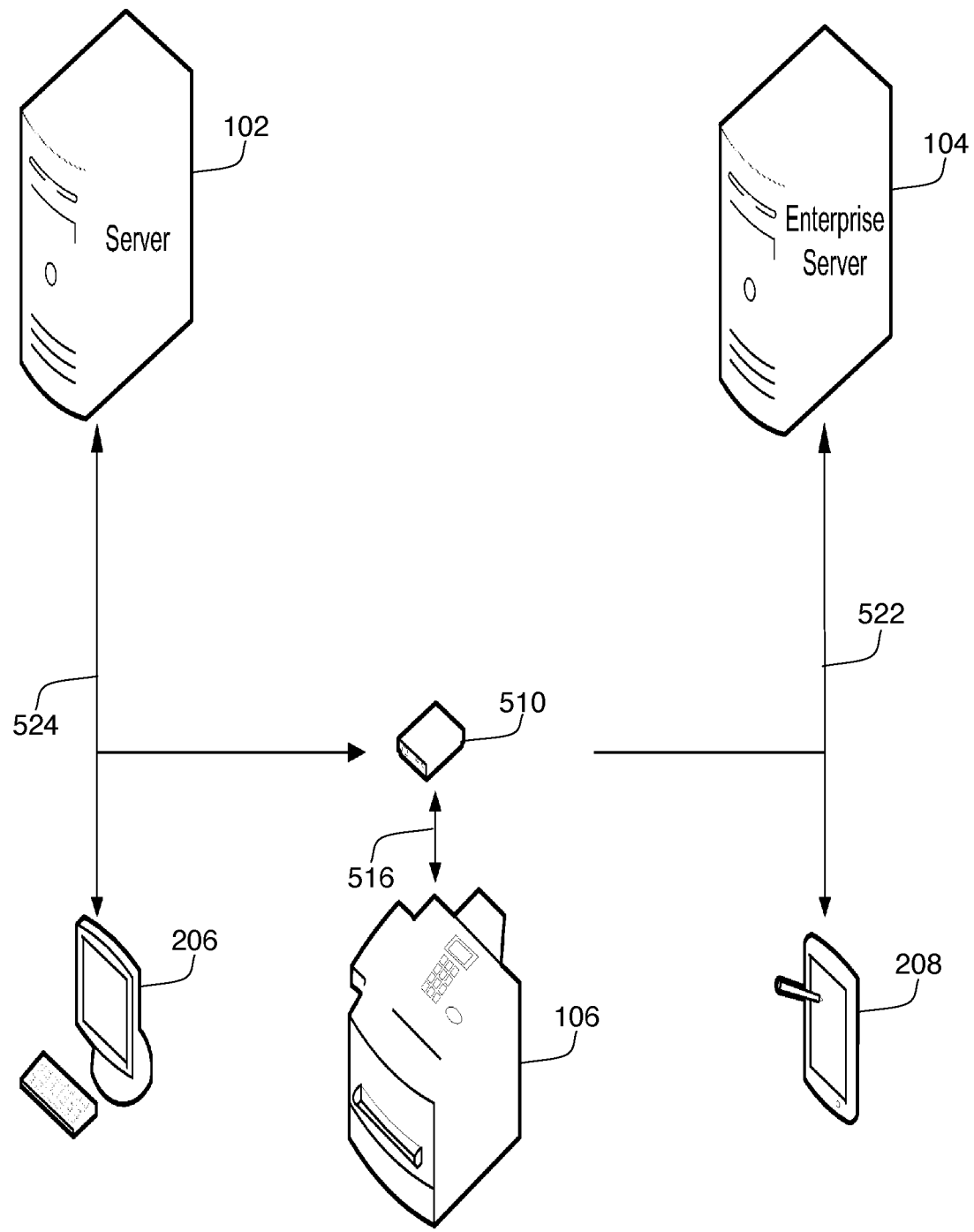
FIG. 4 is an example diagram illustrating a module installed with hardware solution in an alternative architecture.

In accordance with an embodiment of the present invention, and with reference to FIG. 4, module 510 may be included with hardware solution 106 in a configuration wherein both a enterprise server, affiliate servers, and/or any enabled computing system are directly connected to module 510 via connection 524 and 522. Module 510 may communicate with hardware solution 106 via connection 516. In one example, the module is embedded with a web service application programming interface (API). So the diagnostic device integration with business operation software can be done directly via the module without. The module may provide a web platform such that it is configured to communicate via a web interface and web service interface with any computer.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

We claim:

1. A hardware module located within a hardware solution device, the hardware solution device having device components that are configured to be controlled by a local workstation communicating with the device components over a local communication connection, the hardware module having integrated circuit components comprising:
   a) local communication circuitry that communicates with the device components over the local communication connection;
   b) network communications circuitry that communicates with a remote computer system over a computer network; and
   c) converting circuitry programmed to convert between a first protocol used to communicate with the device components over the local communication connection and a second protocol used to communicate with the remote computer system over the computer network, thereby allowing the remote computer system to operate the hardware solution device as if the remote computer system were the local workstation communicating over the local communication connection.

2. The hardware module of claim 1, wherein the local communication connection comprises a connection selected from a set consisting: serial, USB, mini-USB, SCSI, ATA, SATA, eSATA, Firewire, and FiberOptic.

3. The hardware module of claim 1, wherein the hardware solution device is selected from a set of devices consisting of cash dispensers, cash recyclers, coin dispensers, and bill acceptors.

4. The hardware module of claim 1, wherein the local communication connection is a non-network connection.

5. The hardware module of claim 4, wherein the network communications circuitry communicates over an IP network.

6. The hardware module of claim 5, further comprising encryption circuitry programmed to encrypt data communications with the remote computer system.

7. The hardware module of claim 6, further comprising:
   d) network outage circuitry programmed to:
      i) determine when network communications to the remote computer system are non-operational,
      ii) when the network communications to the remote computer system are non-operational, store communications received from the device components on a memory,
      iii) determine when the network communications to the remote computer system are operational, and
      iv) when the network communications to the remote computer system are operational, transmit communications previously stored on the memory to the remote computer system.

8. The hardware module of claim 7, wherein the converting circuitry and the network outage circuitry comprise a programmed microprocessor.

9. The hardware module of claim 7, where in the non-network connection comprises a connection selected from a set consisting of: serial, USB, mini-USB, SCSI, ATA, SATA, eSATA, Firewire, and FiberOptic.

10. The hardware module of claim 7, wherein the hardware solution device is selected from a set of devices consisting of cash dispensers, cash recyclers, coin dispensers, bill acceptors, pin pads, printers, card readers, scanner, and signature pads.

11. The hardware module of claim 7, further comprising encryption circuitry programmed to encrypt data communications with the remote computer system.

12. The hardware module of claim 7, wherein the network outage circuitry determines when the network communications are operational and non-operational using pings sent over the computer network.

13. A system comprising:
   a) a cash recycler hardware solution having a local serial communication connection, the cash recycler hardware solution configured to be controlled by a local workstation over the local serial communication connection using a proprietary protocol; and
   b) a module physically located within the cash recycler hardware solution, the module comprising:
      i) local communication circuitry that communicates with the cash recycler hardware solution over the local serial communication connection;
      ii) network communications circuitry that communicates with a remote computer system over a computer network; and
      iii) converting circuitry programmed to convert between the proprietary protocol used to communicate with the cash recycler hardware solution over the local serial communication connection and a second protocol used to communicate with the remote computer system over the computer network, thereby allowing the remote computer system to operate the cash recycler hardware solution as if the remote computer system were the local workstation communicating over the local serial communication connection.

14. The system of claim 13, wherein the local serial communication connection comprises a connection selected from a set consisting of: serial, USB, mini-USB, SATA, and eSATA.

15. The system of claim 13, wherein the converting circuitry comprises a programmed microprocessor.

16. The system of claim 13, further comprising encryption circuitry programmed to encrypt data communications with the remote computer system.

17. A system of claim 13, wherein the module further comprises:
   iv) network outage circuitry programmed to:
      (1) determine when network communications to the remote computer system are non-operational,
      (2) when the network communications to the remote computer system are non-operational, store communications received from the cash recycler hardware solution on a memory,
      (3) determine when the network communications to the remote computer system are operational, and (4) when the network communications to the remote computer system are operational, transmit communications previously stored on the memory to the remote computer system.

18. A system comprising:
a) a cash dispenser hardware solution having a local serial communication connection, the cash dispenser hardware solution configured to be controlled by a local workstation over the local serial communication connection using a proprietary protocol; and
b) a module physically located within the cash dispenser hardware solution, the module comprising:
   i) local communication circuitry that communicates with the cash dispenser hardware solution over the local serial communication connection;
   ii) network communications circuitry that communicates with a remote computer system over a computer network; and
   iii) converting circuitry programmed to convert between the proprietary protocol used to communicate with the cash dispenser hardware solution over the local serial communication connection and a second protocol used to communicate with the remote computer system over the computer network, thereby allowing the remote computer system to operate the cash dispenser hardware solution as if the remote computer system were the local workstation communicating over the local serial communication connection.

19. The system of claim 18, wherein the local serial communication connection comprises a connection selected from a set consisting of: serial, USB, mini-USB, SATA, and eSATA.

20. The system of claim 18, wherein the converting circuitry comprises a programmed microprocessor.

21. The system of claim 18, further comprising encryption circuitry programmed to encrypt data communications with the remote computer system.

22. A system of claim 18, wherein the module further comprises:
   iv) network outage circuitry programmed to:
      (1) determine when network communications to the remote computer system are non-operational,
      (2) when the network communications to the remote computer system are non-operational, store communications received from the cash dispenser hardware solution on a memory,
      (3) determine when the network communications to the remote computer system are operational, and
      (4) when the network communications to the remote computer system are operational, transmit communications previously stored on the memory to the remote computer system.

23. A standalone communication device comprising:
a) a hardware package containing integrated circuit components for the standalone communication device;
b) a serial connection with a cash recycler, wherein the cash recycler is configured to be controlled over the serial connection using a proprietary protocol;
c) a network connection with a remote computer system over a computer network; and
d) converting circuitry within the hardware package that converts between the proprietary protocol communicated over the serial connection and a universal protocol communicated over the network connection, thereby allowing the remote computer system to operate the cash recycler as if the remote computer system were communicating with the cash recycler over the serial connection using the proprietary protocol.

24. The standalone communication device of claim 23, wherein the serial communication connection comprises a USB connection.

25. The standalone communication device of claim 23, wherein the converting circuitry comprises a programmed microprocessor.

26. The standalone communication device of claim 23, further comprising encryption circuitry programmed to encrypt data communications with the remote computer system.

27. The standalone communication device of claim 23, further comprising:
   iv) network outage circuitry programmed to:
      (1) determine when network communications to the remote computer system are non-operational,
      (2) when the network communications to the remote computer system are non-operational, store communications received from the cash recycler on a memory,
      (3) determine when the network communications to the remote computer system are operational, and
      (4) when the network communications to the remote computer system are operational, transmit communications previously stored on the memory to the remote computer system.

28. A standalone communication device comprising:
a) a hardware package containing integrated circuit components for the standalone communication device;
b) a serial connection with a cash dispenser, wherein the cash dispenser is configured to be controlled over the serial connection using a proprietary protocol;
c) a network connection with a remote computer system over a computer network; and
d) converting circuitry within the hardware package that converts between the proprietary protocol communicated over the serial connection and a universal protocol communicated over the network connection, thereby allowing the remote computer system to operate the cash dispenser as if the remote computer system were communicating with the cash dispenser over the serial connection using the proprietary protocol.

29. The standalone communication device of claim 28, wherein the serial connection comprises a USB connection.

30. The standalone communication device of claim 28, wherein the converting circuitry comprises a programmed microprocessor.

31. The standalone communication device of claim 28, further comprising encryption circuitry programmed to encrypt data communications with the remote computer system.

32. The standalone communication device of claim 28, further comprising:
   iv) network outage circuitry programmed to:
      (1) determine when network communications to the remote computer system are non-operational,
      (2) when the network communications to the remote computer system are non-operational, store communications received from the cash dispenser on a memory,
      (3) determine when the network communications to the remote computer system are operational, and
      (4) when the network communications to the remote computer system are operational, transmit communications previously stored on the memory to the remote computer system.

* * * * *